US012560134B1

(12) United States Patent (10) Patent No.: US 12,560,134 B1
Ross et al. (45) Date of Patent: Feb. 24, 2026

(54) INLET BLEED DIVERSION THROUGH ROTATING DETONATION ROCKET ENGINE

(71) Applicant: Venus Aerospace Corp., Houston, TX (US)

(72) Inventors: William Thomas Ross, Houston, TX (US); Sibylle Frederike Walter, Houston, TX (US)

(73) Assignee: Venus Aerospace Corp., Houston, TX (US)

( * ) Notice: Subject to any disclaimer, the term of this patent is extended or adjusted under 35 U.S.C. 154(b) by 0 days.

(21) Appl. No.: 18/904,832

(22) Filed: Oct. 2, 2024

(51) Int. Cl.
| | |
|---|---|
| *F02K 7/18* | (2006.01) |
| *F02C 6/08* | (2006.01) |
| *F02C 9/18* | (2006.01) |
| *F02C 9/52* | (2006.01) |
| *F02K 7/12* | (2006.01) |
| *F02K 7/16* | (2006.01) |
| *F02K 7/20* | (2006.01) |
| *F02K 9/66* | (2006.01) |
| *F02K 9/78* | (2006.01) |

(52) U.S. Cl.
CPC .................. *F02K 7/18* (2013.01); *F02C 6/08* (2013.01); *F02C 9/18* (2013.01); *F02C 9/52* (2013.01); *F02K 7/12* (2013.01); *F02K 7/16* (2013.01); *F02K 7/20* (2013.01); *F02K 9/66* (2013.01); *F02K 9/78* (2013.01); *F05D 2220/10* (2013.01)

(58) Field of Classification Search
CPC ...... F02C 6/08; F02C 9/18; F02C 9/52; F02K 7/10; F02K 7/12; F02K 7/16; F02K 7/18; F02K 7/20; F02K 9/66; F02K 9/78
See application file for complete search history.

(56) References Cited

U.S. PATENT DOCUMENTS

| | | | | |
|---|---|---|---|---|
| 3,604,211 | A * | 9/1971 | Ghougasian | F02K 7/20 |
| | | | | 60/244 |
| 5,088,660 | A * | 2/1992 | Karanian | B64D 33/02 |
| | | | | 137/15.2 |
| 5,191,761 | A * | 3/1993 | Janeke | F02K 9/42 |
| | | | | 60/768 |
| 8,955,794 | B2 * | 2/2015 | Mackin | F02C 6/12 |
| | | | | 244/134 R |

(Continued)

OTHER PUBLICATIONS

AFRL: "Rotating Detonation Rocket Engines (RDRE)", https://afresearchlab.com/technology/rotating-detonation-rocket-engines-rdre/, Retrieved on Feb. 5, 2025, 6 pages.

(Continued)

*Primary Examiner* — Kyle Robert Thomas

(74) *Attorney, Agent, or Firm* — Casimir Jones, S.C.; Thomas J. Lyneis

(57) ABSTRACT

A rocket-based combined cycle propulsion system comprising an air inlet and a centerbody extending along a center axis. The centerbody at least partially defines the air inlet. The system further includes a first propulsion system (e.g., a rotating detonation rocket engine, RDRE) and a second propulsion system (e.g., a scramjet) coupled with the first propulsion system. The system further includes an air bleed assembly including an inlet aperture formed in the centerbody, an outlet aperture positioned in the first propulsion system, and a duct fluidly connecting the inlet aperture and the outlet aperture.

27 Claims, 5 Drawing Sheets

(56)  References Cited

U.S. PATENT DOCUMENTS

| 11,525,393 | B2 * | 12/2022 | Whitlock | .................. | F02C 7/18 |
|---|---|---|---|---|---|
| 11,840,985 | B2 * | 12/2023 | Aten | ...................... | B64D 29/06 |
| 11,970,995 | B2 | 4/2024 | Duggleby | | |
| 2009/0071120 | A1 | 3/2009 | Bulman | | |

OTHER PUBLICATIONS

Saunders J.D., et al., "Liquefied Bleed for Stability and Efficiency of High Speed Inlets", NASA Aeronautics Research Institute, Feb. 27, 2014, pp. 1-26.

* cited by examiner

INLET BLEED DIVERSION THROUGH ROTATING DETONATION ROCKET ENGINE

TECHNICAL FIELD

The present disclosure relates generally to rockets, rocket engines with secondary combustion, and rocket based combined cycle propulsion systems.

BACKGROUND

Boundary layers are present on all surfaces in fluid flow. For supersonic flow there is a particular issue, as the boundary layer separates when it is impinged on by a shock. Shock impingement can cause the boundary layer to separate, leading to a large area of low-momentum flow. Furthermore, the separated boundary layer creates an uneven surface for the shock to reflect back from, leading to unpredictable shock paths. This effect is called shock wave boundary layer interaction (SWBLI) and is of particular concern to internal flow such as inlets. There are many downstream effects of SWBLI including, but not limited to, triggering inlet unstart through flow separation, as well as augmented heating.

SUMMARY

The disclosure provides, in one aspect, a rocket-based combined cycle propulsion system comprising an air inlet and a centerbody extending along a center axis. The centerbody at least partially defines the air inlet. The system further comprises a first propulsion system, a second propulsion system coupled with the first propulsion system, and an air bleed assembly. The air bleed assembly includes an inlet aperture formed in the centerbody, an outlet aperture positioned in the first propulsion system, and a duct fluidly connecting the inlet aperture and the outlet aperture.

In some embodiments, the system further comprises an outer cowl, wherein the centerbody is at least partially positioned within the outer cowl, and wherein the outer cowl at least partially defines the air inlet.

In some embodiments, the inlet aperture is positioned on the centerbody such that the inlet aperture is aligned with a leading end of the outer cowl along the center axis.

In some embodiments, the inlet aperture is positioned at the air inlet.

In some embodiments, the centerbody includes an inlet cone portion extending from the air inlet, and wherein the inlet aperture is positioned on the inlet cone portion.

In some embodiments, the inlet aperture is one of a plurality of inlet apertures formed in the centerbody, wherein the duct fluidly connects each of the plurality of inlet apertures to the outlet aperture.

In some embodiments, each of the plurality of inlet apertures is positioned at a first axial location along the center axis.

In some embodiments, one of the plurality of inlet apertures is positioned at a first axial location along the center axis; and another one of the plurality of inlet apertures is positioned at a second axial location axially along the center axis.

In some embodiments, the air bleed assembly further includes a plenum and a plurality of bores extending between the plurality of inlet apertures and the plenum.

In some embodiments, each of the plurality of bores includes a diameter and a length extending between the inlet aperture and the plenum; wherein a ratio of the length to the diameter is within a range of 2-3.

In some embodiments, the air bleed assembly further includes one or more channels extending between the inlet aperture and the duct.

In some embodiments, the one or more channels are arcuate.

In some embodiments, the duct is aligned with the center axis.

In some embodiments, the first propulsion system includes a rotating detonation rocket engine (RDRE); and wherein the RDRE is positioned between the air inlet and a flameholder of the second propulsion system.

In some embodiments, the RDRE includes an annulus defining an annulus axis, wherein the annulus axis is parallel with the center axis.

In some embodiments, the annulus includes an inner wall and an outer wall, and wherein the inner wall and the outer wall define a detonation chamber therebetween.

In some embodiments, the inner wall at least partially defines a body, and wherein the outlet aperture is positioned on an axial end surface of the body.

In some embodiments, the RDRE includes a fuel source, an oxidizer source, and a plurality of injectors positioned around the detonation chamber.

In some embodiments, the RDRE is oriented such that, during operation of the rocket-based combined cycle propulsion system, exhaust from the RDRE will affect the air prior to the air being used in combustion by the second propulsion system.

In some embodiments, said RDRE increases a temperature and a pressure of said air prior to said air being received by said second propulsion system.

In some embodiments, the second propulsion system is a ramjet or a scramjet.

In some embodiments, a mass flow through the air bleed assembly is within a range of 0%-5% of a total mass flow through the rocket-based combined cycle propulsion system.

In some embodiments, a suction present at the inlet aperture is at least partially based on a throttle of the first propulsion system.

In some embodiments, suction at the inlet aperture remains when the first propulsion system is off.

In some embodiments, air passing through the bleed assembly cools the first propulsion system.

In some embodiments, the system further comprises a regulator positioned at the inlet aperture or in the duct, wherein the regulator is configured to control a mass flow rate through the inlet aperture.

In some embodiments, the regulator is configured to actively adjust the mass flow rate through the inlet aperture.

In some embodiments, the air bleed assembly further comprises a valve and a secondary airflow circuit; wherein control of the valve select whether air flowing through the air bleed assembly flows to the first propulsion system or to the secondary airflow circuit.

In some embodiments, the first propulsion system is a bi-propellant deflagration rocket engine or a mono-propellant rocket engine.

Other aspects of the disclosure will become apparent by consideration of the detailed description and accompanying drawings.

BRIEF DESCRIPTION OF THE DRAWINGS

These and other features, aspects, and advantages of the present technology will become better understood with regards to the following drawings. The accompanying figures and examples are provided by way of illustration and not by way of limitation.

Figure 1:
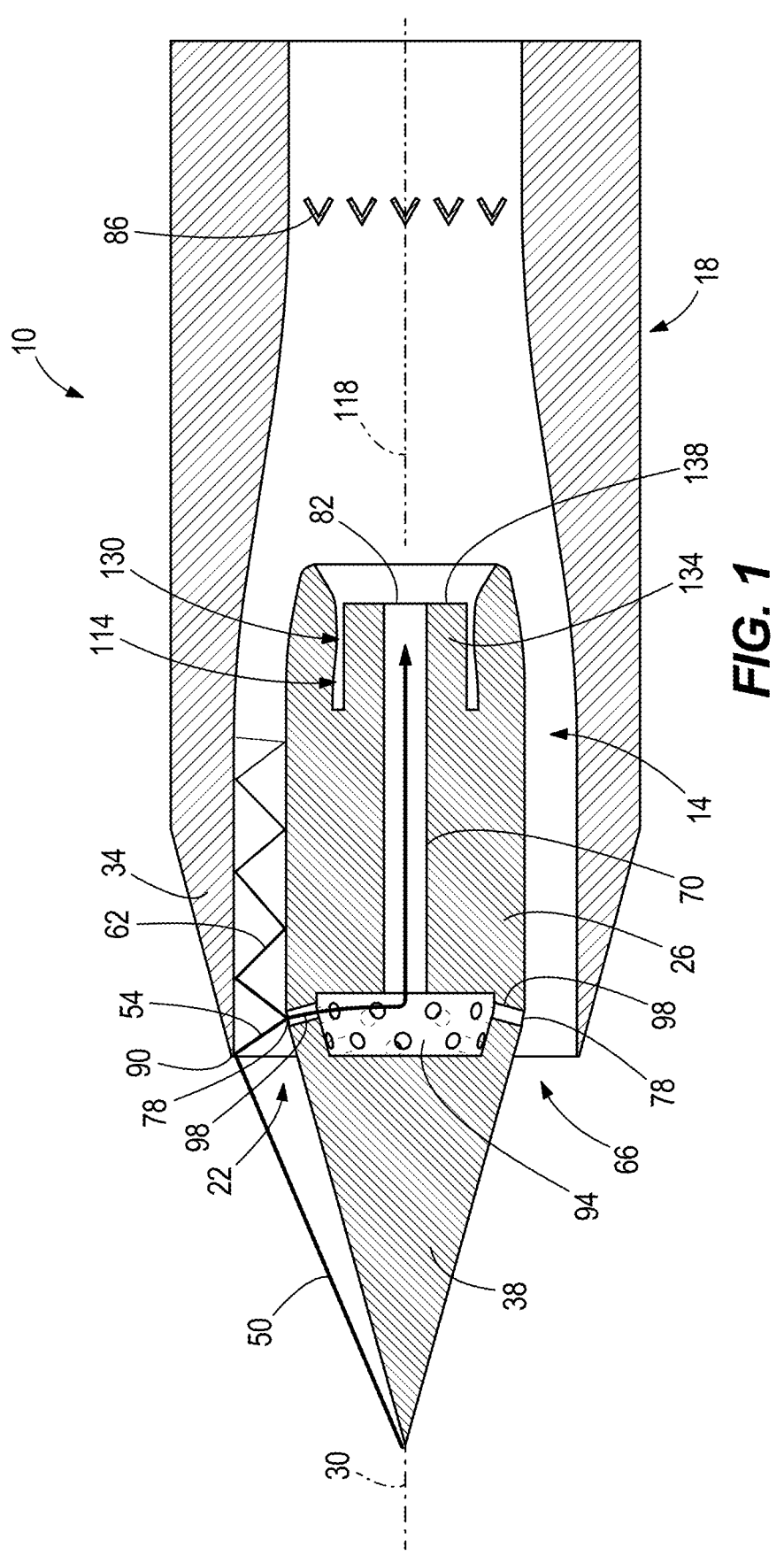
FIG. 1 is a cross-sectional schematic of a rocket-based combined cycle propulsion system including an air bleed assembly.

Before any embodiments are explained in detail, it is to be understood that the invention is not limited in its application to the details of construction and the arrangement of components set forth in the following description or illustrated in the following drawings. The invention is capable of other embodiments and of being practiced or of being carried out in various ways.

The drawings referred to herein should not be understood as being drawn to scale unless specifically noted.

DETAILED DESCRIPTION

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications, and equivalents, which may be included in the spirit and scope of the various embodiments.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present disclosure. All publications, patent applications, patents and other references mentioned herein are incorporated by reference in their entirety. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "an" and "the" include plural references unless the context clearly dictates otherwise. The present disclosure also contemplates other embodiments "comprising," "consisting of" and "consisting essentially of," the embodiments or elements presented herein, whether explicitly set forth or not.

Reference throughout this specification to "one embodiment," "certain embodiments," "an embodiment," "various embodiments," "some embodiments," or similar term(s) means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

The term "coupled," as used herein, is defined as "connected," although not necessarily directly, and not necessarily mechanically. The term coupled is to be understood to mean physically, magnetically, chemically, fluidly, electrically, or otherwise coupled, connected or linked and does not exclude the presence of intermediate elements between the coupled elements absent specific contrary language. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.).

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another elements, component, region, layer, or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments. In the various embodiments, elements or any described steps do not imply any particular order of operation, unless explicitly stated therein.

The process of combustion is integral to many types of combustion engines including, but not limited to, rocket engines. The process of combustion is commonly defined as either a "deflagration" or as a "detonation".

In a deflagration combustion, the combustion wave that is generated will typically have a maximum velocity that is sub-sonic. Hence, the deflagration combustion process is sometimes referred to as being approximately an isobaric combustion.

In a detonation combustion, flame velocities typically reach supersonic speeds and detonation combustion processes are capable of generating an overpressure which can significantly exceed 20-100 times the initial combustion pressure. Thus, the detonation combustion process is sometimes referred to as being an approximately isochoric combustion. Moreover, when compared to deflagration, detonation has a faster heat release, a reduced entropy, and a greater thermal efficiency.

As a result of the advantageous characteristics of a detonation combustion, detonation-based propulsion engines (e.g., detonation-based rocket engines) have been developed. One type of detonation-based rocket engine is a rotating detonation rocket engine (RDRE). Rotating Detonation Rocket Engines (RDREs) are engines using a form of pressure gain combustion, based on a detonation wave traveling around an annular reaction chamber or reaction channel or annulus. In detonative combustion, the process achieves supersonic flow to provide propulsion. RDREs theoretically are more efficient than conventional deflagrative combustion rocket engines.

With reference to FIG. 1, a rocket-based combined cycle (RBCC) propulsion system 10 including a first propulsion system 14 and a second propulsions system 18 coupled with the first propulsion system 14. In the illustrated embodiment, the first propulsion system 14 is a rotating detonation rocket engine (RDRE), and the second propulsion system 18 is a ramjet or a supersonic combustion ramjet (scramjet). For purposes of brevity and clarity, the following description refers to the first propulsion system 14 as a RDRE and the second propulsion system 18 as a scramjet. It should be noted, however, embodiments of the present invention are well suited to utilizing various other propulsion systems for the first propulsion system 14 and the second propulsions system 18. For example, in other embodiments, the first propulsion system is a bi-propellant deflagration rocket engine or a mono-propellant rocket engine.

With continued reference to FIG. 1, the thrust vector for the RDRE 14 is parallel with the thrust vector for the scramjet 18. In the illustrated embodiment, the exhaust from the RDRE 14 is mixed with the intake air of the scramjet 18. The combined cycle is obtained as heat from the detonation wave of the RDRE 14, and the corresponding exhaust from the RDRE 14 increases the temperature and expands the induced air entering the scramjet 18. In other words, during operation of rocket-based combined cycle propulsion system 10, exhaust from the RDRE 14 affects the air being used in combustion by the scramjet 18. For example, in some embodiments, the RDRE 14 increases a temperature and a pressure of the air prior to the air being received by the scramjet 18. This results in increased thrust for the scramjet 18 without requiring additional fuel for the scramjet 18.

With continued reference to FIG. 1, the system 10 includes an air inlet 22 and a centerbody 26 extending along a center axis 30. In some embodiments, the system 10 further includes an outer cowl 34 and the centerbody 26 is at least partially positioned within the outer cowl 34. The centerbody 26 includes an inlet cone portion 38 extending from the air inlet 22. In the illustrated embodiment, the centerbody 26 at least partially defines the air inlet 22, and the outer cowl 34 at least partially defines the air inlet 22.

Figure 2A:
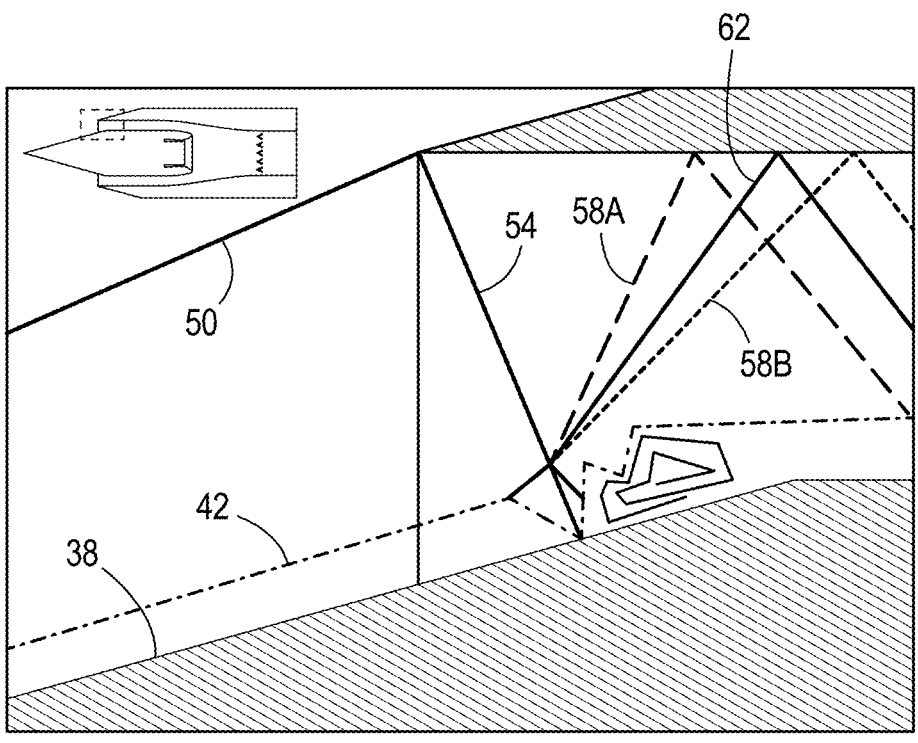
FIG. 2A is a cross-sectional schematic illustrating shock wave boundary layer interaction (SWBLI) in a mixed compression inlet.

With reference to FIG. 2A, a problematic example of shock wave boundary layer interaction (SWBLI) is illustrated at an air inlet where an incoming shock is reflected. A boundary layer 42 on the inlet cone portion 38 grows, and when an incoming shock 50 reflects, a reflected shock 54 meets the boundary layer 42 instead of the surface of the inlet cone portion 38. Where the reflected shock 54 impinges the boundary layer 42, the reflected shock 54 is bifurcated and separated. After impact with the reflected shock 54, the boundary layer 42 may oscillate in a stochastic frequency, and the reflected shock 54 changes to an unpredictable shock trajectory 58A, 58B instead of a predictable shock trajectory 62.

Figure 2B:
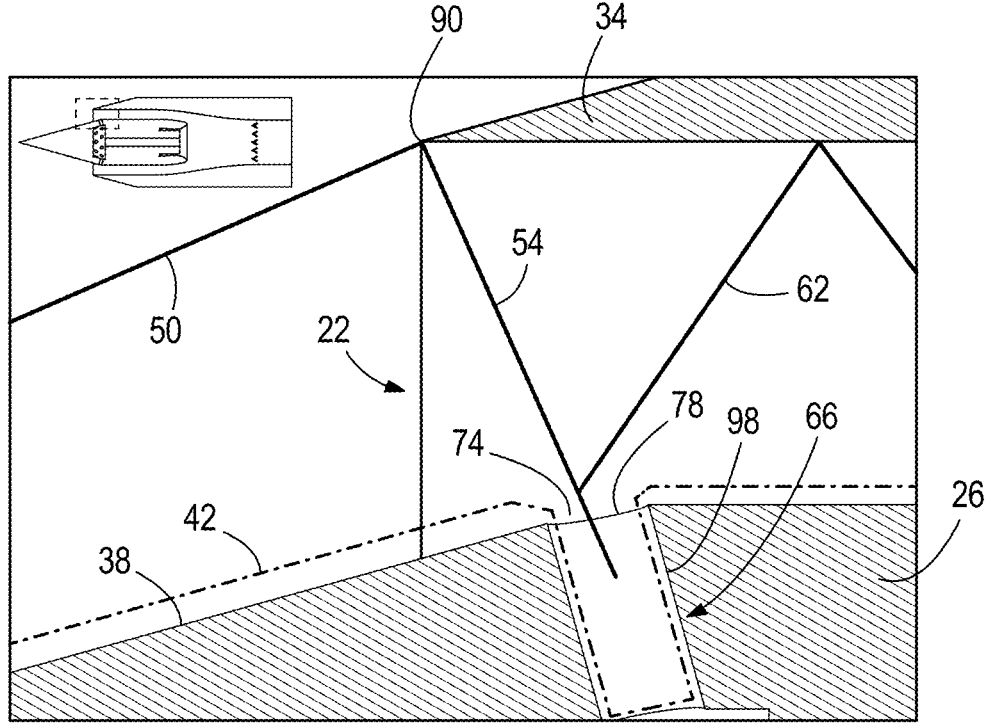
FIG. 2B is a cross-sectional schematic illustrating the air bleed assembly in a mixed compression inlet of FIG. 1.

With reference to FIG. 2B, to prevent the problematic SWBLI, the boundary layer 42 is removed from the surface of the inlet cone portion 38 with an air bleed assembly 66. The boundary layer 42 is diverted through an inlet aperture 78 and into a bore 98 that leads to a duct 70, which provides the reflected shock 54 with a smooth surface 74 to reflect from. This results in the predictable shock trajectory 62 and removing the undesirable SWBLI effects. Typically, the air passing through a conventional air bleed assembly is vented overboard. However, venting bleed air overboard requires long ducting through the vehicle until a low pressure area is located where the air can be dumped overboard.

With continued reference to FIG. 1, the system 10 includes an air bleed assembly 66 with an inlet aperture 78 formed in the centerbody 26, an outlet aperture 82 positioned in the RDRE 14, and the duct 70 fluidly connecting the inlet aperture 78 and the outlet aperture 82. In the illustrated embodiment, the RDRE 14 is positioned in the centerbody 26, and the duct 70 advantageously goes through the center of the RDRE 14. In the illustrated embodiment, the duct 70 is aligned with the center axis 30. In some embodiments, the RDRE 14 is positioned between the air inlet 22 and a flameholder 86 of the scramjet 18. The RDRE 14 will cause a form of suction, which in some embodiments is enough to pull the boundary layer 42 air through the vehicle. As such, the system 10 advantageously utilized bleed air that would typically need to be dumped overboard and instead reintroduces the bleed air in the RDRE 14. In other words, instead of dumping the bled air overboard (which has an associated drag penalty), bleed air can be directed through the RDRE 14, while the RDRE 14 simultaneously can be used as an ejector to entrain bleed air (providing some or all of the needed suction). While drag reduction is likely the primary benefit, this method has the added benefit of providing air for cooling the RDRE 14. For example, the air bleed assembly 66 may serve as a way to entrain air and provide additional cooling for the RDRE 14.

As detailed further herein, the system 10 advantageously prevents SWBLI in a rocket-based combined cycle (RBCC) propulsion system while also eliminating the need to reject bleed air overboard (and the associated drag penalty) and providing a source of cooling for the rotating detonation rocket engine (RDRE). As such, the system 10 disclosed herein removes the boundary layer using bleed air to improve performance and operational flexibility of the system 10 while reducing or eliminating risk of negative effects.

With continued reference to FIG. 1, the inlet aperture 78 is positioned on the centerbody 26 such that the inlet aperture 78 is aligned with a leading end 90 of the outer cowl 34 along the center axis 30. In the illustrated embodiment, the inlet aperture 78 is positioned at the air inlet 22. In other embodiment, the inlet aperture is positioned at least partially upstream of the air inlet or at least partially downstream of the air inlet. In some embodiments, the inlet aperture 78 is positioned on the inlet cone portion 38 of the centerbody 26.

In the illustrated embodiment, the inlet aperture 78 is one of a plurality of inlet apertures 78 formed in the centerbody 26. The duct 70 fluidly connects each of the plurality of inlet apertures 78 to the outlet aperture 82. In some embodiments, each of the plurality of inlet apertures 78 is positioned at a first axial location along the center axis 30. In some embodiments, the plurality of inlet apertures 78 are positioned at various axial locations along the center axis 30. For example, with reference to FIG. 3, one of the plurality of inlet aperture 78A is positioned at a first axial location along the center axis 30, and another one of the plurality of inlet apertures 78B is positioned at a second axial location axially along the center axis 30.

Figure 3:
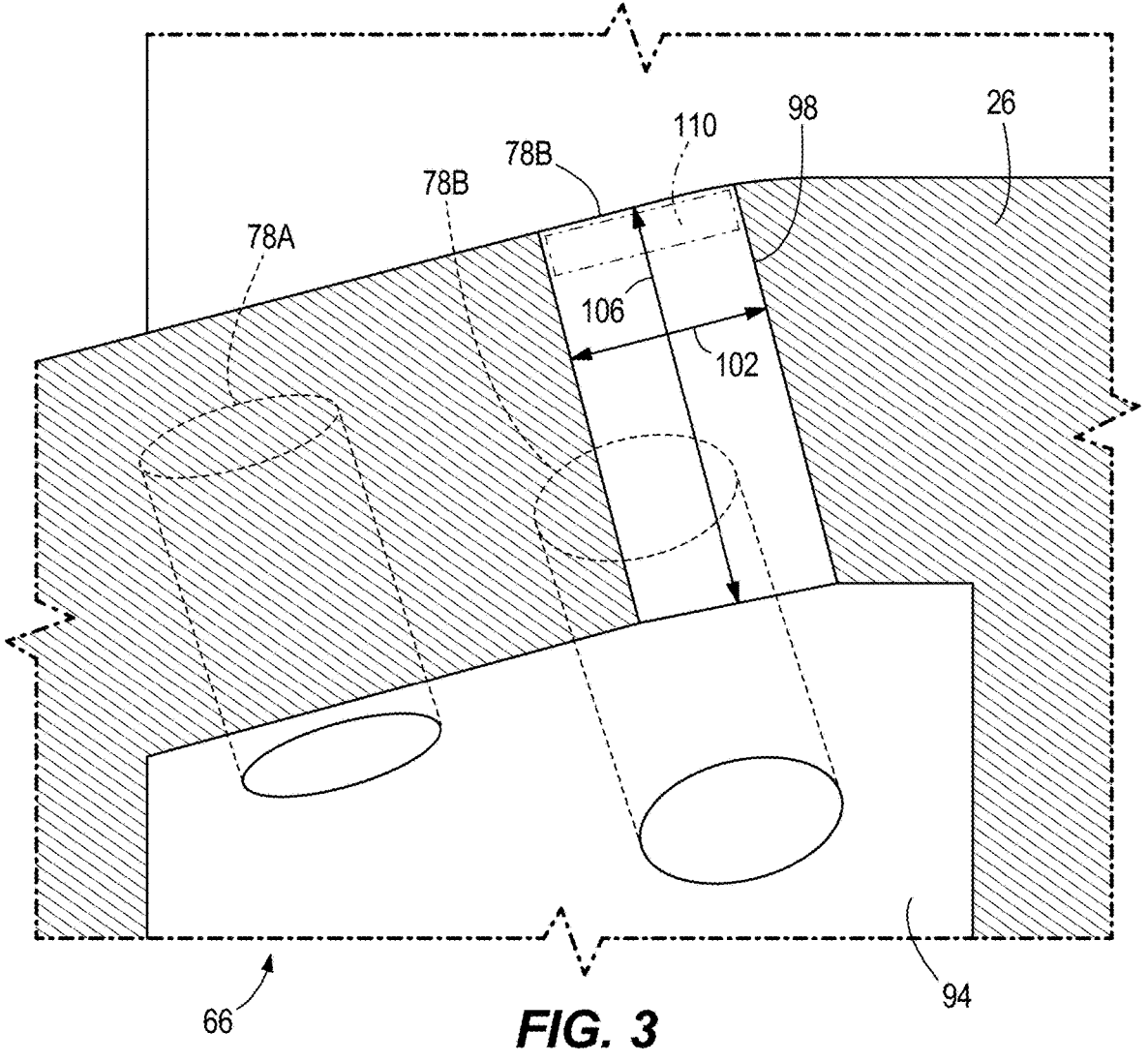
FIG. 3 is a cross-sectional view of a portion of the air bleed assembly of FIG. 1.

With continued reference to FIG. 1, the air bleed assembly 66 further includes a plenum 94 and a plurality of bores 98 extending between the plurality of inlet apertures 78 and the plenum 94. With reference to FIG. 3, each of the plurality of bores 98 includes a diameter 102 and a length 106 extending between the inlet aperture 78 and the plenum 94. In the illustrated embodiment, a ratio R of the length 106 to the diameter 102 is within a range of approximately 2 to approximately 3. In some embodiments, the ratio R of the length 106 to the diameter 102 is within a range of approximately 1 to approximately 4. In the illustrated embodiments, the bores 98 extend perpendicular to the surface of the inlet cone portion 38. In some embodiments, the bores 98 are non-orthogonal to the surface of the inlet cone portion 38 (e.g., the bores 98 are angled into the inlet air or angled away from the inlet air).

With continued reference to FIG. 3, in some embodiments, a regulator 110 is positioned at the inlet aperture 78, and the regulator 110 is configured to control a mass flow rate through the inlet aperture 78. In some embodiments, the regulator 110 is positioned inside the duct 70, or any other suitable location within the air bleed assembly 66. In some embodiments, the regulator 110 is passive (e.g., a baffle plate, etc.). In other embodiments, the regulator 110 is actively controlled (e.g., by an electronic controller) and configured to actively adjust the mass flow rate through the inlet aperture 78 (e.g., an opening configured to vary in size, etc.).

Figure 4:
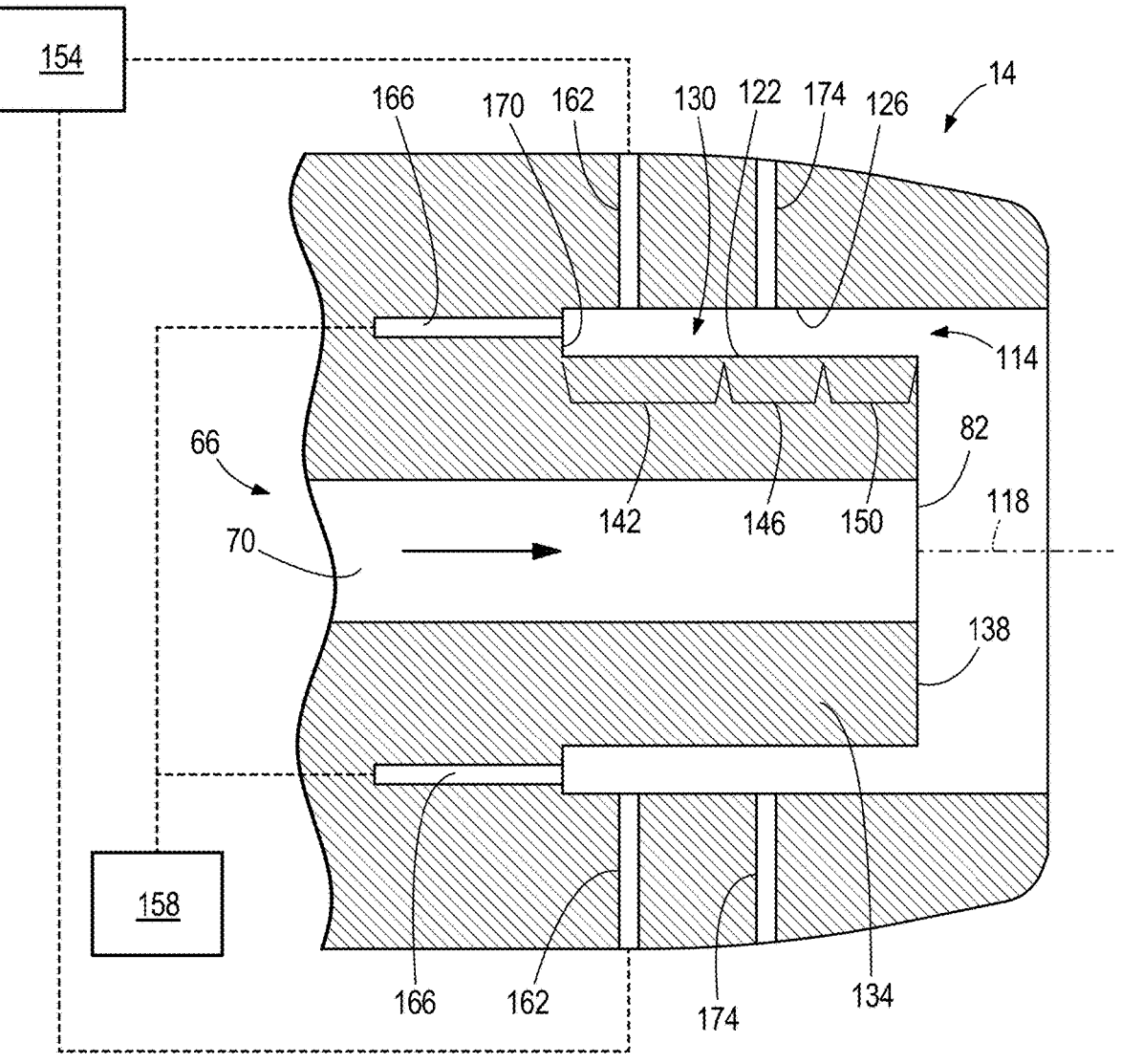
FIG. 4 is a schematic of a portion of an air bleed assembly and a rotating detonation rocket engine (RDRE).

With reference to FIG. 4, the RDRE 14 includes an annulus 114 defining an annulus axis 118. In some embodiments, the annulus axis 118 is parallel with the center axis 30. In the illustrated embodiment, the annulus axis 118 is co-axial with the center axis 30. The annulus 114 includes an inner wall 122 and an outer wall 126 that define a detonation chamber 130 therebetween. In the illustrated embodiment, the inner wall 122 at least partially defines a body 134, and the outlet aperture 82 of the air bleed assembly 66 is positioned on an axial end surface 138 of the body 134. In the illustrated embodiment, the axial end surface 138 is planar. In other embodiments, the axial end surface 138 of the body 134 in the RDRE 14 is a cone surface or any suitable shape. In some embodiments, the outlet aperture 82 of the air bleed assembly 66 is centered on the axial end surface 138 of the body 134 (e.g., aligned with the annulus axis 118). In other embodiments, the outlet aperture 82 and the duct 70 are offset from the annulus axis 118 or center axis 30.

With continued reference to FIG. 4, the RDRE 14 includes a mixing section 142 where the fuel and the oxidizer are mixed, a combustion section 146 where the fuel and the oxidizer undergo combustion, and a nozzle section 150 where the products of combustion expend out of the annulus 114. The RDRE 14 includes a fuel source 154, an oxidizer source 158, and a plurality of injectors 162, 166 positioned around the detonation chamber 130. In the illustrated embodiment, the plurality of injectors 162, 166 includes at least one fuel injector 162 and at least one oxidizer injector 166. In the illustrated embodiment, the fuel injectors 162 are positioned on the outer wall 126, and the oxidizer injectors 166 are positioned on an axial end surface 170 extending between the inner wall 122 and the outer wall 126. In some embodiments, the fuel injector is concentric with the oxidizer injector. During operation of the RDRE 14, fuel from the fuel source 154 is introduced into the mixing section 142 by the fuel injectors 162, while oxidizer from the oxidizer source 158 is introduced into the mixing section 142 by the oxidizer injectors 166. By way of example, the oxidizer comprises liquid $H_2O_2$, while the fuel comprises liquid JP-8. In some embodiments, the RDRE 14 includes one or more ignition torches 174 that extend at least partially into the detonation chamber 130.

In operation of the RDRE 14, to achieve ignition, typically the oxidizer is first delivered into the mixing section 142 and then the ignition torches 174 are ignited and then the fuel is introduced into the mixing section 12. Once detonation is achieved, the ignition torches are deactivated, and combustion continues as long as the oxidizer and the fuel delivery continues. In other words, one detonation ignites the fuel/oxidizer mixture, which releases the energy necessary to sustain the detonation in subsequent order. The products of detonation combustion expand out of the annulus 114 and are further pushed out of the annulus by incoming fuel and oxidizer, resulting in a propelling force. Various RDRE designs may be utilized with the air bleed assemblies disclosed herein.

In some embodiments, a mass flow through the air bleed assembly 66 is within a range of approximately 0% to approximately 5% of a total mass flow through the rocket-based combined cycle propulsion system 10. In some embodiments, the mass flow through the air bleed assembly 66 is within a range of approximately 1% to approximately 3% of a total mass flow through the rocket-based combined cycle propulsion system 10. In the illustrated embodiment, a suction present at the inlet aperture 78 is at least partially based on a throttle of the RDRE 14. In other words, the suction at the inlet aperture 78 may increase as the throttle of the RDRE 14 increases. Advantageously, in some embodiments, suction at the inlet aperture 78 remains even when the RDRE 14 is off or inactive. In some embodiments, a mass flow through the air bleed assembly 66 is zero, for example, when no air bleed is needed or desired. In some embodiments, purge gases from the RDRE 14 are directed to blow out a foreign object that has been injected into the air bleed assembly 66. In other words, purge gases from the RDRE 14 may be utilized to push foreign object debris back out of the inlet apertures 78.

Figure 5:
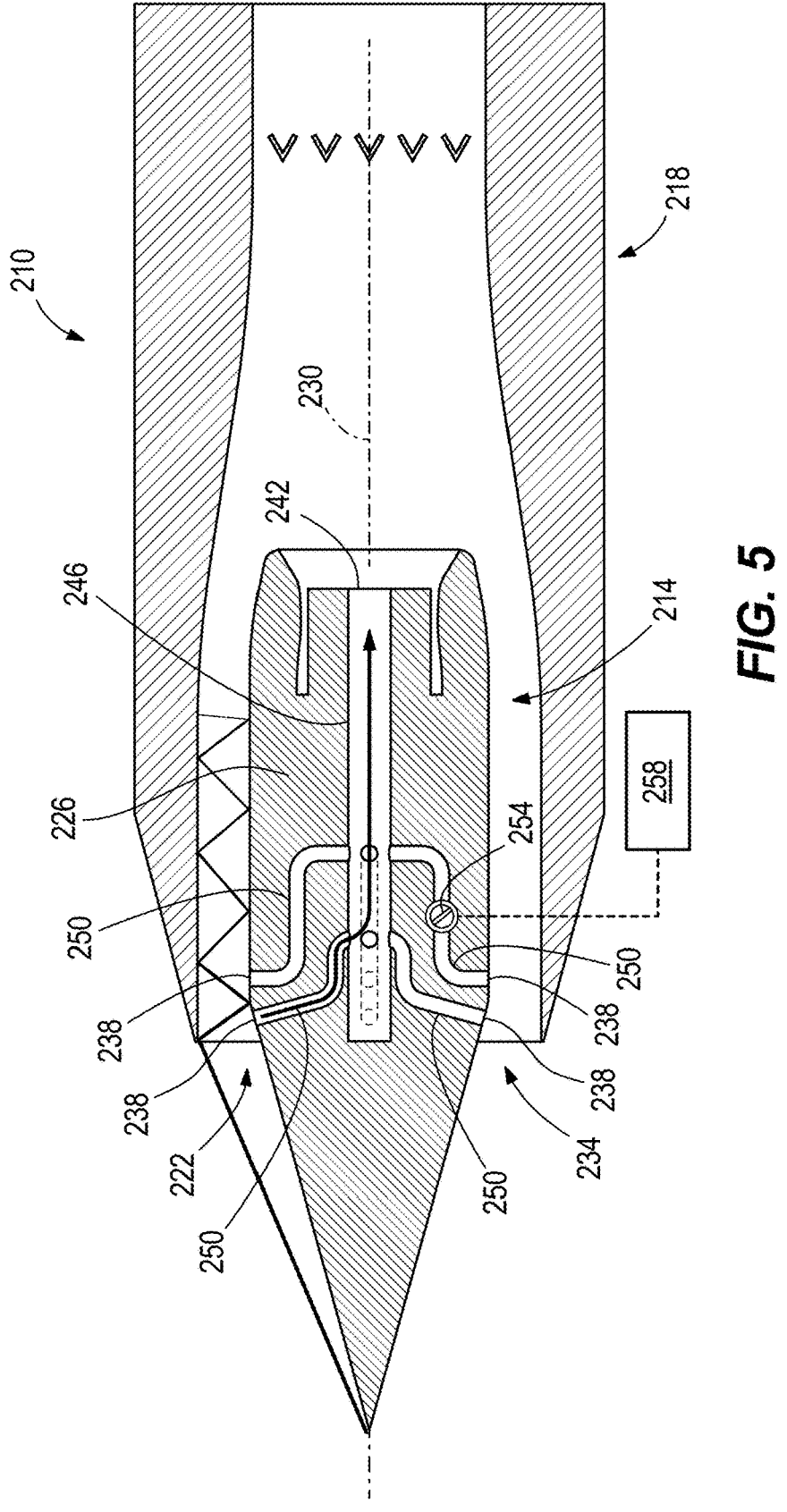
FIG. 5 is a cross-sectional schematic of a rocket-based combined cycle propulsion system including an air bleed assembly.

With reference to FIG. 5, a rocket-based combined cycle propulsion (RBCC) system 210 includes a first propulsion system 214, and a second propulsion system 218 coupled with the first propulsion system 214, an air inlet 222, and a centerbody 226 extending along a center axis 230. The system 210 further includes an air bleed assembly 234 with a plurality of inlet aperture 238 formed in the centerbody 226, an outlet aperture 242 positioned in the first propulsion system 214, and a duct 246 fluidly connecting the inlet apertures 238 and the outlet aperture 242. In the illustrated embodiment, the air bleed assembly 234 further includes channels 250 extending between the inlet apertures 238 and the duct 246. In the illustrated embodiment, one channel 250 extends between each of the inlet apertures 238 and the duct 246. In the illustrated embodiment, the channels 250 are arcuate or curved. In other embodiments, the channels 250 are rectangular or any other suitable shape. The channels 250 are advantageously large enough to accommodate moving air away from the high pressure of the shocks and communicate the air with the suction of the first propulsion system 214.

With continued reference to FIG. 5, in some embodiments, the air bleed assembly 234 further includes a valve 254 and a secondary airflow circuit 258. Control of the valve 254 selects whether air flowing through the air bleed assembly 234 flows to the first propulsion system 214 or to the secondary airflow circuit 258. In other words, the valve 254 selectively directs the bleed air at least one of a plurality of possible outlets. The secondary airflow circuit 258 may be utilized for cooling or other suitable uses elsewhere on the vehicle.

While various embodiments are discussed herein, it will be understood that they are not intended to limit to these embodiments. On the contrary, the presented embodiments are intended to cover alternatives, modifications, and equivalents, which may be included in the spirit and scope of the various embodiments. Furthermore, numerous specific details set forth herein provide a thorough understanding of embodiments of the present subject matter. However, embodiments may be practiced without these specific details.

Although one or more embodiments of the present invention have been described in some detail for clarity of understanding, it will be apparent that certain changes and modifications may be made within the scope of the various embodiments. Accordingly, the described embodiments are to be considered as illustrative and not restrictive, and the scope of the various embodiments is not to be limited to details given herein, but may be modified. In the various embodiments, elements and/or any described steps do not imply any particular order of operation, unless explicitly stated therein.

Various features and advantages are set forth in the following claims.

What is claimed is:

1. A rocket-based combined cycle propulsion system comprising:
   an air inlet;
   a centerbody extending along a center axis, wherein the centerbody at least partially defines the air inlet;
   a first propulsion system;
   a second propulsion system coupled with the first propulsion system; and
   an air bleed assembly including an inlet aperture formed in the centerbody, an outlet aperture positioned in the first propulsion system, and a duct fluidly connecting the inlet aperture and the outlet aperture; and
   wherein the first propulsion system includes a rotating detonation rocket engine (RDRE); and wherein the RDRE is positioned between the air inlet and a flameholder of the second propulsion system.

2. The system of claim 1, further comprising an outer cowl, wherein the centerbody is at least partially positioned within the outer cowl, and wherein the outer cowl at least partially defines the air inlet.

3. The system of claim 2, wherein the inlet aperture is positioned on the centerbody such that the inlet aperture is aligned with a leading end of the outer cowl along the center axis.

4. The system of claim 1, wherein the inlet aperture is positioned at the air inlet.

5. The system of claim 1, wherein the centerbody includes an inlet cone portion extending from the air inlet, and wherein the inlet aperture is positioned on the inlet cone portion.

6. The system of claim 1, the inlet aperture is one of a plurality of inlet apertures formed in the centerbody, wherein the duct fluidly connects each of the plurality of inlet apertures to the outlet aperture.

7. The system of claim 6, wherein each of the plurality of inlet apertures is positioned at a first axial location along the center axis.

8. The system of claim 6, wherein one of the plurality of inlet apertures is positioned at a first axial location along the center axis; and another one of the plurality of inlet apertures is positioned at a second axial location axially along the center axis.

9. The system of claim 6, wherein the air bleed assembly further includes a plenum and a plurality of bores extending between the plurality of inlet apertures and the plenum.

10. The system of claim 9, wherein each of the plurality of bores includes a diameter and a length extending between the inlet aperture and the plenum; wherein a ratio of the length to the diameter is within a range of 2-3.

11. The system of claim 1, wherein the air bleed assembly further includes one or more channels extending between the inlet aperture and the duct.

12. The system of claim 11, wherein the one or more channels are arcuate.

13. The system of claim 1, wherein the duct is aligned with the center axis.

14. The system of claim 1, wherein the RDRE includes an annulus defining an annulus axis, wherein the annulus axis is parallel with the center axis.

15. The system of claim 14, wherein the annulus includes an inner wall and an outer wall, and wherein the inner wall and the outer wall define a detonation chamber therebetween.

16. The system of claim 15, wherein the inner wall at least partially defines a body, and wherein the outlet aperture is positioned on an axial end surface of the body.

17. The system of claim 15, wherein the RDRE includes a fuel source, an oxidizer source, and a plurality of injectors positioned around the detonation chamber.

18. The system of claim 1, wherein the RDRE is oriented such that, during operation of the rocket-based combined cycle propulsion system, exhaust from the RDRE will affect the air prior to the air being used in combustion by the second propulsion system.

19. The system of claim 18, wherein said RDRE increases a temperature and a pressure of said air prior to said air being received by said second propulsion system.

20. The system of claim 1, wherein the second propulsion system is a ramjet or a scramjet.

21. The system of claim 1, wherein a mass flow through the air bleed assembly is within a range of 0%-5% of a total mass flow through the rocket-based combined cycle propulsion system.

22. The system of claim 1, wherein a suction present at the inlet aperture is at least partially based on a throttle of the first propulsion system.

23. The system of claim 22, wherein suction at the inlet aperture remains when the first propulsion system is off.

24. The system of claim 1, wherein air passing through the bleed assembly cools the first propulsion system.

25. The system of claim 1, further comprising a regulator positioned at the inlet aperture or in the duct, wherein the regulator is configured to control a mass flow rate through the inlet aperture.

26. The system of claim 25, wherein the regulator is configured to actively adjust the mass flow rate through the inlet aperture.

27. The system of claim 1, wherein the air bleed assembly further comprises a valve and a secondary airflow circuit; wherein control of the valve select whether air flowing through the air bleed assembly flows to the first propulsion system or to the secondary airflow circuit.

* * * * *